(12) United States Patent
Wang et al.

(10) Patent No.: US 11,204,130 B2
(45) Date of Patent: Dec. 21, 2021

(54) ROTATING DEVICE PROVIDING ROTATIONAL PRECISION FOR A HELD OBJECT

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhen Wang, Shenzhen (CN); Ching-Feng Chen, New Taipei (TW); Ji-Ping Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/598,735

(22) Filed: Oct. 10, 2019

(65) Prior Publication Data
US 2020/0377038 A1    Dec. 3, 2020

(30) Foreign Application Priority Data

Jun. 3, 2019    (CN) .......................... 201910476258.1

(51) Int. Cl.
*F16M 11/10*    (2006.01)
*B60R 11/02*    (2006.01)
*F16M 11/18*    (2006.01)

(52) U.S. Cl.
CPC ....... *F16M 11/105* (2013.01); *B60R 11/0241* (2013.01); *F16M 11/10* (2013.01); *F16M 11/18* (2013.01); *F16M 2200/021* (2013.01)

(58) Field of Classification Search
CPC ............. F16M 11/105; F16M 11/2021; F16M 11/2028; F16M 11/10; F16M 11/18; F16M 2200/021; B60R 11/0241
USPC ........................................................ 248/919
See application file for complete search history.

(56) References Cited

U.S. PATENT DOCUMENTS

| | | | |
|---|---|---|---|
| 5,923,528 A * | 7/1999 | Lee ....................... | F16M 11/105 248/291.1 |
| 5,941,493 A * | 8/1999 | Cheng .................. | F16M 11/105 248/371 |
| 6,079,682 A * | 6/2000 | Olkkola .............. | B60R 11/0241 248/278.1 |
| 6,189,842 B1 * | 2/2001 | Bergeron Gull ..... | F16M 11/105 248/125.1 |

(Continued)

FOREIGN PATENT DOCUMENTS

WO    WO-2013127090 A1 *   9/2013    ............. F16M 11/18
WO    WO-2020049453 A1 *   3/2020    ............ F16M 13/022

*Primary Examiner* — Eret C McNichols
(74) *Attorney, Agent, or Firm* — ScienBiziP, P.C.

(57) ABSTRACT

A rotating device configured to rotate and position a product at multiple precision angles includes a base and an angle defining disk. The angle defining disk defines a circular through hole. A rotating mechanism is received in the through hole and a positioning mechanism is connected to the rotating mechanism. The periphery of an inner wall of the through hole includes a plurality of locating slots. The rotating mechanism is capable of rotating in the through hole by an external force and driving the positioning mechanism to rotate relative to the angle defining disk. The rotation causes the rotating mechanism to move and take a precise position from one locating slot to another locating slot.

9 Claims, 8 Drawing Sheets

(56) References Cited

U.S. PATENT DOCUMENTS

| | | | | |
|---|---|---|---|---|
| 6,244,553 B1* | 6/2001 | Wang | | B60R 11/02 248/278.1 |
| 6,427,288 B1* | 8/2002 | Saito | | F16M 11/105 16/335 |
| 6,437,975 B1* | 8/2002 | Huang | | F16M 11/105 361/679.22 |
| 6,443,408 B1* | 9/2002 | Hung | | F16M 11/105 248/130 |
| 6,510,049 B2* | 1/2003 | Rosen | | F16M 11/105 248/919 |
| 6,522,748 B1* | 2/2003 | Wang | | B60R 11/02 379/446 |
| 7,424,994 B2* | 9/2008 | Jeong | | F16M 11/105 248/276.1 |
| 7,564,682 B2* | 7/2009 | Liou | | F16M 11/105 248/125.1 |
| 7,594,631 B1* | 9/2009 | Carnevali | | B60R 11/0258 248/219.4 |
| 7,748,670 B1* | 7/2010 | Veldez | | F16M 13/02 248/181.1 |
| 7,766,288 B2* | 8/2010 | Kim | | F16M 11/2064 248/176.1 |
| 7,963,488 B2* | 6/2011 | Hasegawa | | F16M 11/105 248/183.2 |
| 7,975,969 B2* | 7/2011 | Jan | | F16M 11/08 248/125.7 |
| 7,987,560 B2* | 8/2011 | Wang | | F16M 11/2021 16/367 |
| 8,215,596 B2* | 7/2012 | Duan | | F16M 11/10 248/176.1 |
| 8,282,060 B2* | 10/2012 | Fan | | F16M 11/041 248/291.1 |
| 8,613,379 B2* | 12/2013 | Lee | | B62J 11/00 224/282 |
| 8,720,837 B2* | 5/2014 | Li | | F16M 11/14 248/188.6 |
| 8,941,989 B2* | 1/2015 | Pollex | | F16M 13/04 361/679.59 |
| 9,062,811 B2* | 6/2015 | Yu | | F16M 11/2021 |
| 9,120,432 B2* | 9/2015 | Fan | | B60R 11/02 |
| 9,377,154 B2* | 6/2016 | Hung | | F16M 11/105 |
| 9,388,933 B2* | 7/2016 | Zhang | | F16M 11/10 |
| 10,716,402 B2* | 7/2020 | Wang | | F16B 1/00 |
| 10,865,934 B2* | 12/2020 | Kwasniewski | | F16M 11/2064 |
| 10,875,467 B2* | 12/2020 | Keller | | B60R 11/0241 |
| 10,890,288 B2* | 1/2021 | Gurr | | F16F 15/10 |
| 2001/0046409 A1* | 11/2001 | Fischer | | B60R 11/02 403/92 |
| 2003/0201370 A1* | 10/2003 | Ron | | F16C 11/10 248/276.1 |
| 2007/0064379 A1* | 3/2007 | Shin | | F16M 11/105 361/679.06 |
| 2008/0006748 A1* | 1/2008 | Watanabe | | F16M 11/08 248/186.2 |
| 2008/0055832 A1* | 3/2008 | Ozolins | | F16M 11/14 361/679.04 |
| 2009/0223102 A1* | 9/2009 | Li | | H04N 1/00562 40/763 |
| 2010/0187273 A1* | 7/2010 | Niwai | | B60R 11/0241 224/545 |
| 2011/0267748 A1* | 11/2011 | Lane | | A45F 5/00 361/679.01 |
| 2012/0145843 A1* | 6/2012 | Ho | | F16M 13/00 248/176.3 |
| 2013/0200119 A1* | 8/2013 | Ackeret | | B60R 11/0235 224/275 |
| 2015/0285432 A1* | 10/2015 | Johnson | | F16M 11/08 248/476 |
| 2017/0327054 A1* | 11/2017 | Yu | | G06F 1/16 |
| 2018/0251078 A1* | 9/2018 | Kim | | B60R 11/0258 |
| 2020/0228690 A1* | 7/2020 | Chin | | A47G 1/02 |
| 2020/0300407 A1* | 9/2020 | Lee | | F16M 11/10 |
| 2020/0366131 A1* | 11/2020 | Min | | B60R 11/0241 |
| 2021/0016720 A1* | 1/2021 | Bai | | B60R 11/0235 |

* cited by examiner

ROTATING DEVICE PROVIDING ROTATIONAL PRECISION FOR A HELD OBJECT

FIELD

The disclosure generally relates to rotating device.

BACKGROUND

In mobile phones, a display panel usually has nine screws at different orientations. When using a screwdriver to remove the screws, the screwdriver should have a normal working angle, and thus the mobile phone needs to be fixed at different angles. However, most existing rotating devices do not precisely control the angles of rotations.

BRIEF DESCRIPTION OF THE DRAWINGS

Implementations of the present technology will now be described, by way of embodiments, with reference to the attached figures.

DETAILED DESCRIPTION

Figure 1:
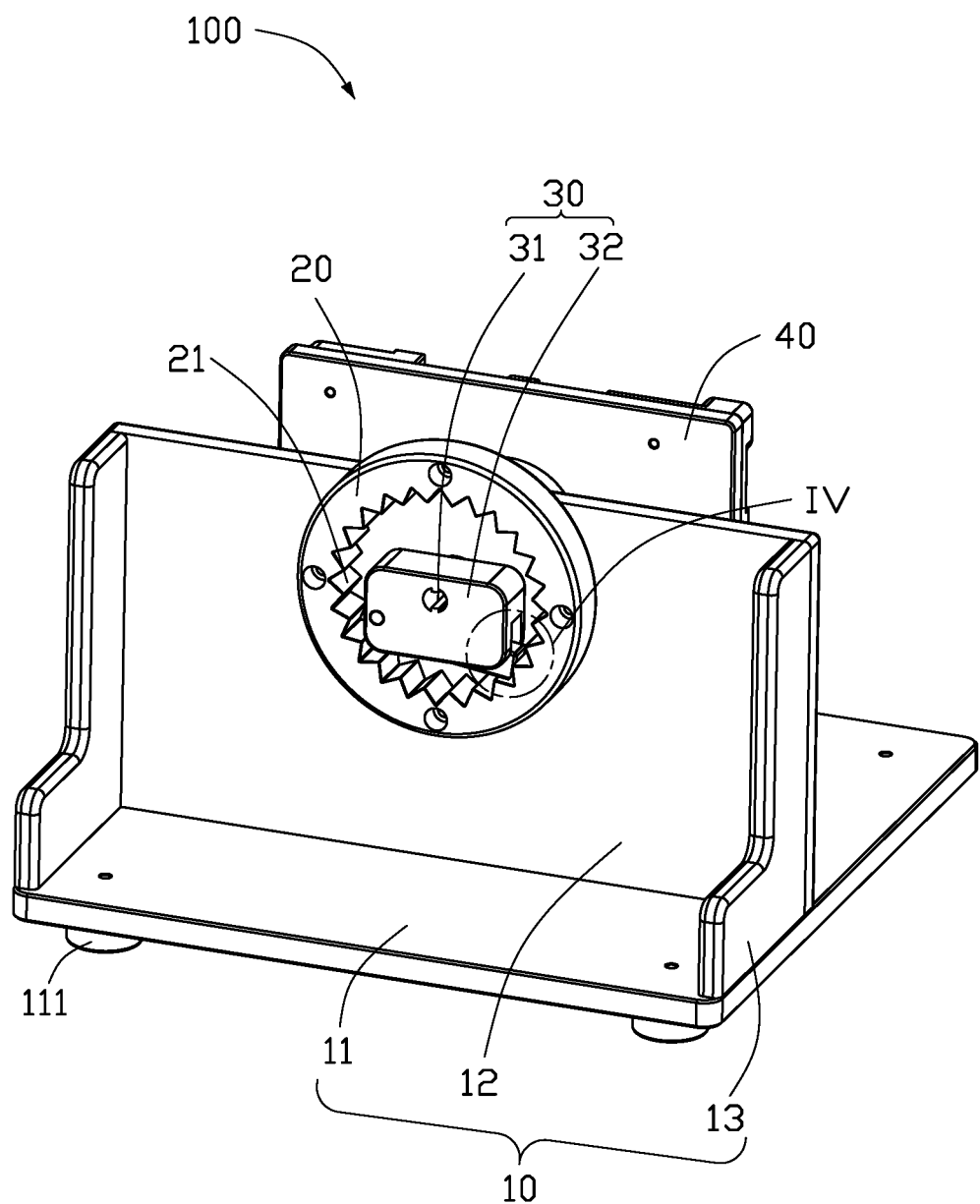
FIG. 1 is an isometric view of a rotating device of a first embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates a first embodiment of a rotating device 100. The rotating device 100 is configured to rotate and position a product at multiple angles. The product can be, but is not limited to, a mobile phone or a tablet computer. The rotating device 100 includes a base 10, an angle defining disk 20, a rotating mechanism 30, and a positioning mechanism 40. The angle defining disk 20 and the rotating mechanism 30 are connected to the base 10, and the positioning mechanism 40 is connected to the rotating mechanism 30. The angle defining disk 20 is configured to limit a rotation angle of the rotating mechanism 30, the rotating mechanism 30 is configured to rotate the positioning mechanism 40, and the positioning mechanism 40 is configured to position the product.

The base 10 includes a first fixing plate 11 which can be flat, a second fixing plate 12, and a connecting plate 13 vertically connected to the first fixing plate 11. In at least one embodiment, the first fixing plate 11 and the second fixing plate 12 are substantially rectangular, and the connecting plate 13 is substantially L-shaped. The base 11 has four supporting columns 111 arranged at one side of the first fixing plate 11 away from the second fixing plate 12. The four supporting columns 111 are arranged at four corners of the first fixing plate 11.

In other embodiments, the base 10 may be circular, polygonal, or other shape. The supporting columns 11 may be omitted.

Figure 3:
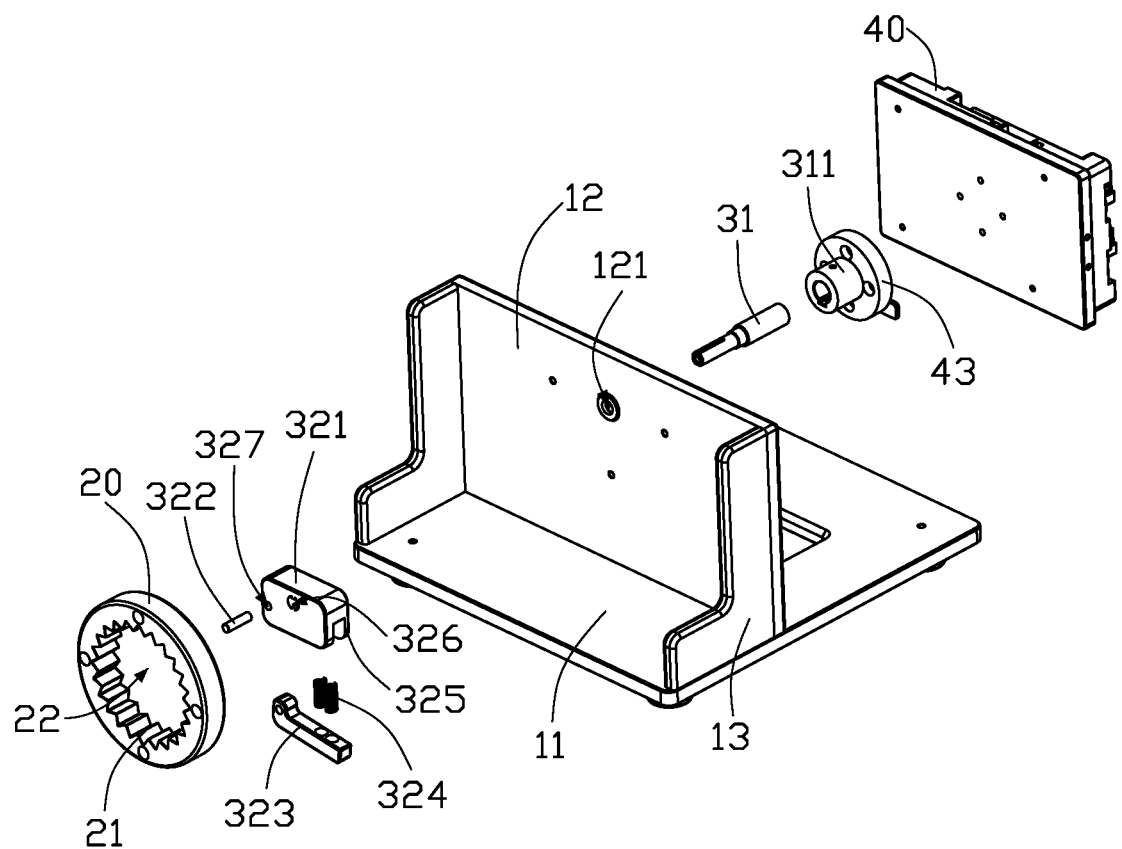
FIG. 3 is an exploded isometric view of the rotating device of FIG. 1.

FIG. 3 illustrates that the second fixing plate 12 defines a shaft hole 121. The angle defining disk 20 is fixed to the second fixing plate 12 and is substantially annular. A central portion of the angle defining disk 20 can define a through hole 22, and an inner side surface of the through hole 22 is uniformly provided with a plurality of locating slots 21. The locating slots 21 are arranged circumferentially around the through hole 22. Each locating slot is V-shaped, and an opening of the locating slot 21 faces the center of the through hole 22. The rotating mechanism 30 can be held in one of the locating slots 21, thus the rotating mechanism 30 can be positioned at a predetermined angle defined by a certain locating slot 21. The rotating mechanism 30 is capable of rotating in the through hole 22 by an external force and driving the positioning mechanism 40 to rotate relative to the angle defining disk 20. When the rotating mechanism 30 rotates, the rotating mechanism 30 can rotate from one locating slot 21 to another locating slot 21, thus the positioning mechanism 40 can be rotated and positioned at other predetermined angles.

In at least one embodiments, the locating slots 21 are evenly arranged along circumference of the through hole 22. In other embodiments, the locating slots 21 may be arranged non-uniformly, and the position and direction of the locating slots 21 may be set according to the actual angles required. In an embodiment, the number of the locating slots 21 is 24. It can be understood that in other embodiments, the number of the locating slots 21 can also be, but is not limited to, 6, 9, 10, 12, 36, 72, etc.

In other embodiments, the locating slot 21 may have other shapes, such as a U-shape or a semicircular shape. The angle defining disk 20 may also be square, polygonal, or elliptical, not being limited.

Referring to FIG. 1 and FIG. 3, the rotating mechanism 30 includes a shaft 31 and a rotating handle 32.

The shaft 31 passes through the shaft hole 121, and one end of the shaft 31 is connected to the positioning mechanism 40. Other end of the shaft 31 passes through the rotating handle 32 and corresponds to the center of the angle defining disk 20, thus the positioning mechanism 40 and the rotating handle 32 can rotate synchronously. A bearing 311 is disposed between the second fixing plate 12 and positioning mechanism 40. The bearing 311 is sleeved on the shaft 31 for smooth and repeatable rotation of the shaft 31. The bearing 311 is configured to reduce vibrations of the shaft 31 when the shaft 31 rotates.

The rotating handle 32 includes a main body 321, a pivot 322, a holding part 323, and an elastic member 324. The main body 321 is received in the through hole. The elastic member 324 is arranged between the main body 321 and the holding part 323. The main body 321 is substantially rectangular, one end of the pivot 322 is connected to the main body 321, and other end of the pivot 322 is connected to the holding part 323. The holding part 323 is pivotally connected to the main body 321 through the pivot 322. One end of the holding part 323 away from the pivot 322 can be held in one of the locating slots 21, and the holding part 323 may be rectangular.

Figure 4:
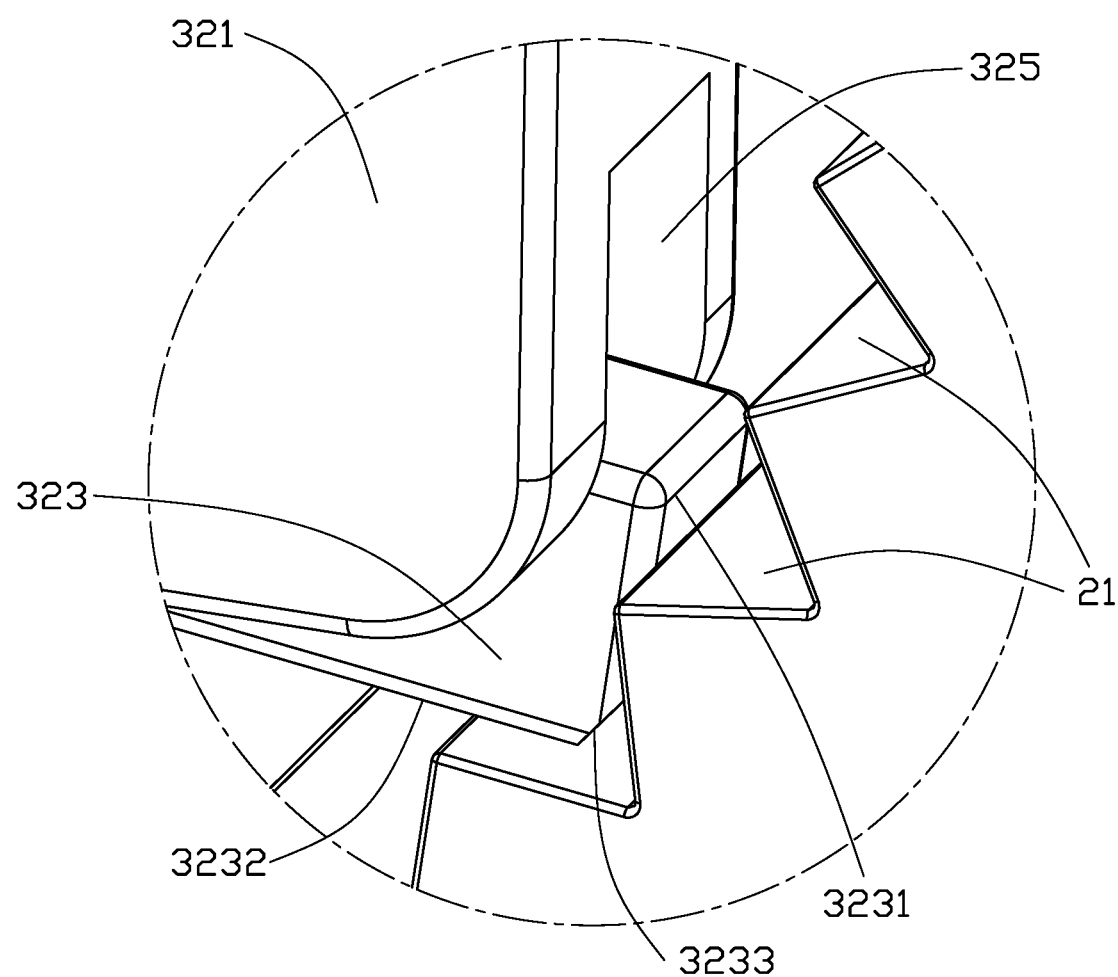
FIG. 4 is a view of circled area IV of the rotating device of FIG. 1.

FIG. 4 illustrates that the holding part 323 includes a first limiting surface 3231 and a second limiting surface 3232 vertically connected to the first limiting surface 3231. The first limiting surface 3231 and the second limiting surface 3232 can abut against two opposing surfaces of a locating slot 21, respectively, that is, within the V-shape of the locating slot 21. The connection between the first limiting surface 3231 and the second limiting surface 3232 is provided with a chamfer 3233 for precision in movement and for reducing resistance when the holding part 323 moves between adjacent locating slots 21. Referring to FIG. 3, the elastic member 324 is disposed between one end of the holding part 323 away from the pivot 322 and the main body 321. Two ends of the elastic member 324 urge the holding part 323 out of the main body 321.

In at least one embodiment, there are two elastic members 324, and the elastic members 324 are springs. In at least one embodiment, a length of the first limiting surface 3231 and a length of the second limiting surface are greater than a depth of the locating slot 21.

In at least one embodiment, the main body 321 further defines a receiving groove 325, a first rotating hole 326, and a second rotating hole 327. The pivot 322 and the elastic member 324 are received in the receiving groove 325. One end of the holding part 323 is received in the receiving groove 325, and other end of the holding part 323 is held in one of the locating slots 21. The shaft 31 passes through the first rotating hole 326, thereby the shaft 31 is rotatably connected to the main body 321. The pivot 322 passes through the second rotating hole 327 and the holding part 323, thereby the pivot 322 is rotatably connected to the main body 321.

In other embodiments, the rotating mechanism 30 is not limited to the above embodiment, as long as the rotating mechanism 30 can rotate relative to the angle defining disk 20 and drive the positioning mechanism 40 to rotate, and provided that the rotating mechanism 30 can be positioned at a predetermined angle. In at least one embodiment, the rotating handle 32 may be other than rectangular, as long as the rotating handle 32 can be clamped in one locating slot 21, move out of the locating slot 21, and be clamped in another locating slot 21. The holding part 323 and the elastic member 324 can be omitted, and the rotating handle 32 can be made of a material capable of elastic deformation, such that the rotating handle 32 can be deformed to move out of the current locating slot 21 and into another locating slot 21.

Figure 2:
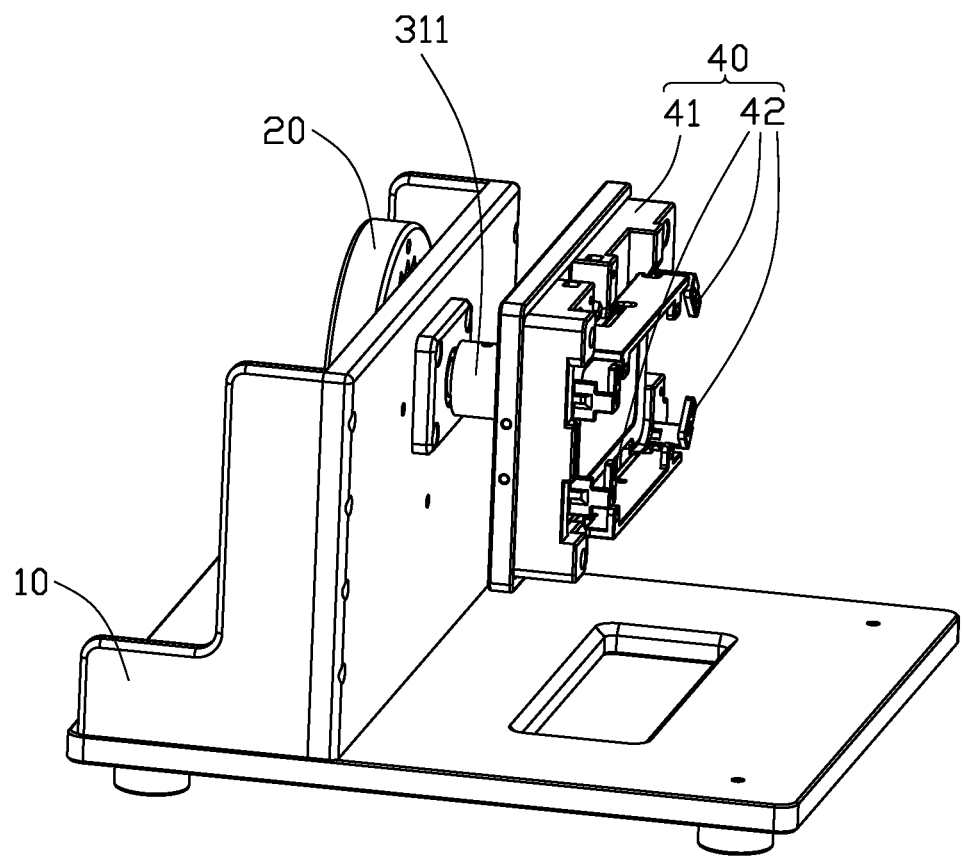
FIG. 2 is an isometric view of the rotating device of FIG. 1 viewed from another angle.

FIG. 2 illustrates that the positioning mechanism 40 includes a support plate 41, and a plurality of guiding blocks 42 arranged on the support plate 41. The support plate 41 may be substantially rectangular. The guiding blocks 42 is substantially L-shaped. In at least one embodiment, four guiding blocks 42 are squarely distributed for positioning the product.

FIG. 3 illustrates that the positioning mechanism 40 further includes a connecting portion 43 positioned at one side of the support plate 41 adjacent to the base 10. The bearing 311 can be connected to the connecting portion 43.

Referring to FIG. 1 and FIG. 2, the positioning mechanism 40 rotates synchronously with the shaft 31 and the rotating handle 32. The rotating handle 32 drives the pivot 322 to rotate and acts to compress the elastic member 324 to move the holding part 323 out of one locating slot 21, the holding part 323 then being clamped into one other locating slot 21 under the elastic force of the elastic member 324. It can be understood that the rotating handle 32 can be rotated to drive the positioning mechanism 40 to rotate synchronously, and the positioning mechanism 40 can also be rotated to drive the rotating handle 32 to rotate synchronously.

Figure 5:
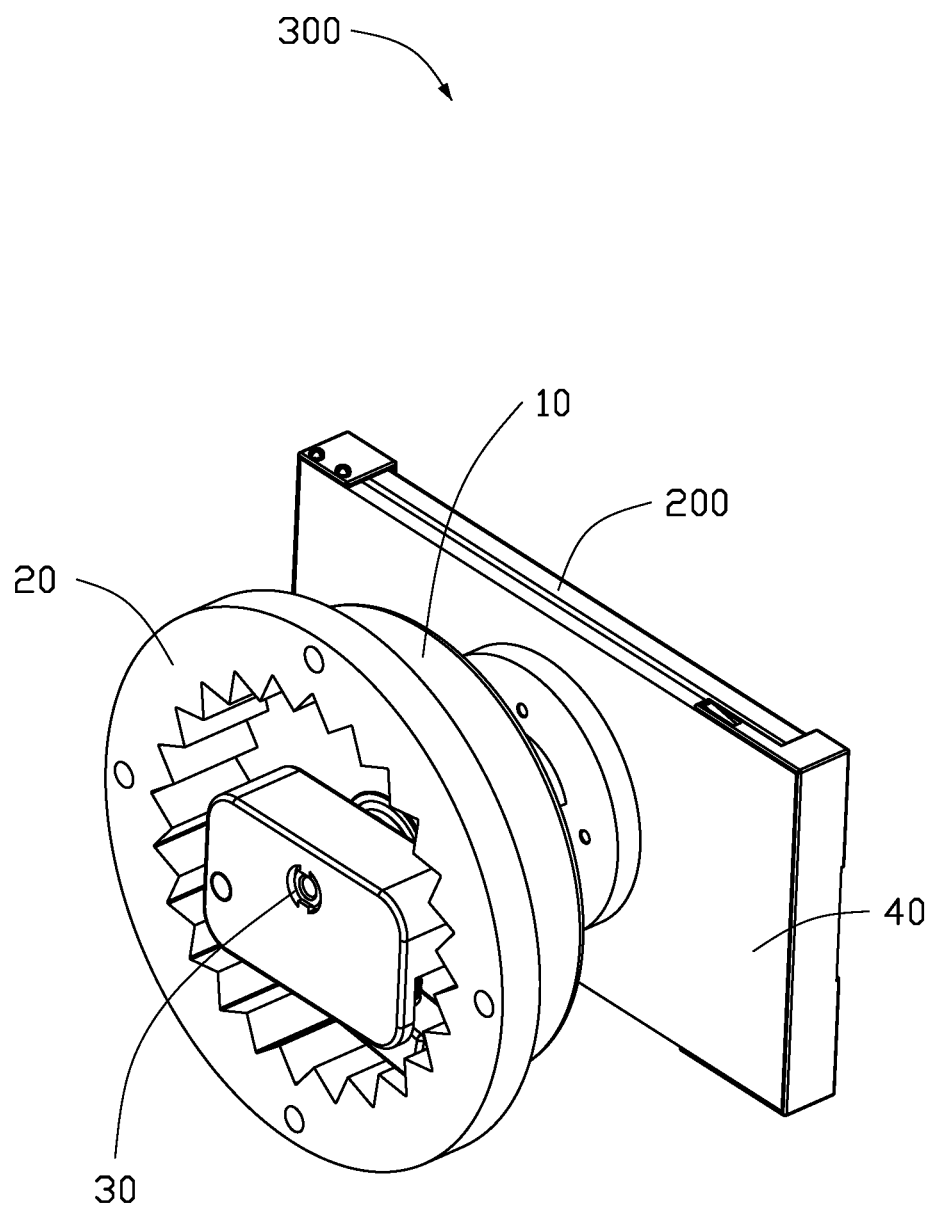
FIG. 5 is an isometric view of a rotating device of a second embodiment of the disclosure.

FIG. 5 illustrates a rotating device 300 of a second embodiment. Similar to the rotating device 100 of the first embodiment, the rotating device 300 of the second embodiment includes a base 10, an angle defining disk 20, a rotating mechanism 30 arranged on the base 10, and a positioning mechanism 40 connected to the rotating mechanism 30. The positioning mechanism 40 is used to position the product 200.

Figure 6:
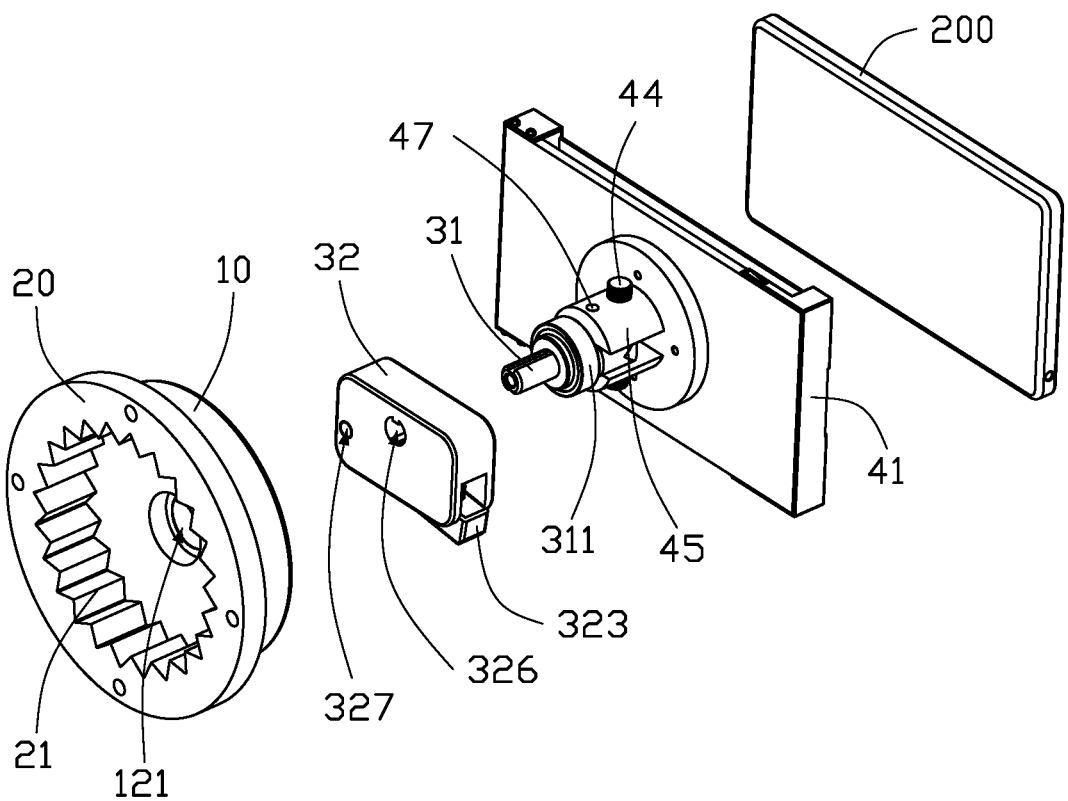
FIG. 6 is an exploded isometric view of the rotating device of FIG. 5.

FIG. 6 illustrates that the second embodiment is different from the first embodiment in that the base 10 has a disk shape, and the center of the base 10 is provided with a shaft hole 121. The angle defining disk 20 is fixedly connected and concentric with base 10. The positioning mechanism 40 includes a support plate 41, two rotating screws 44, two positioning plates 45, and a rotating shaft 47. The two positioning plates 45 are arranged at two sides of shaft 31 and connected to the support plate 41. The rotating shaft 47 passes through the two positioning plates 45 and the shaft 31. The support plate 41 is capable of rotating about the rotating shaft 47, and the rotating screw 44 is used to define the rotation of the rotating shaft 47. Each rotating screw 44 passes through one positioning plate 45.

In this embodiment, the base 10 can be fixed on the wall, and the rotation angle of the product 200 can be adjusted by rotating the rotating shaft 47. The area occupied by the product can thus be reduced, and the user does not need to hold the product 200, which reduces the risk of the product 200 being broken or dropped, and reduces the operating cost. The rotating device 300 can also be fixed in a control board of a vehicle.

Figure 7:
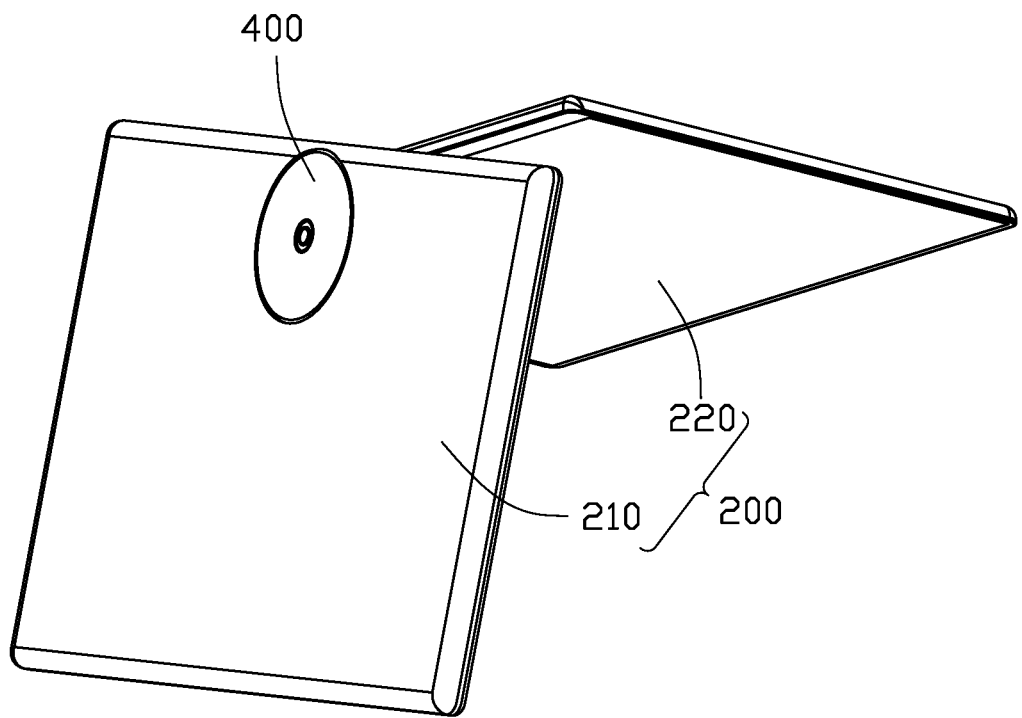
FIG. 7 is an isometric view of a rotating device of a third embodiment of the disclosure.

FIG. 7 illustrates a rotating device 400 of a third embodiment. The rotating device 400 carries a product 200 and is configured to rotate the product 200. The product 200 may be for example a notebook computer that includes a notebook computer host 210 and a display 220, and the display 220 can be rotated by means of the rotating device 400.

Figure 8:
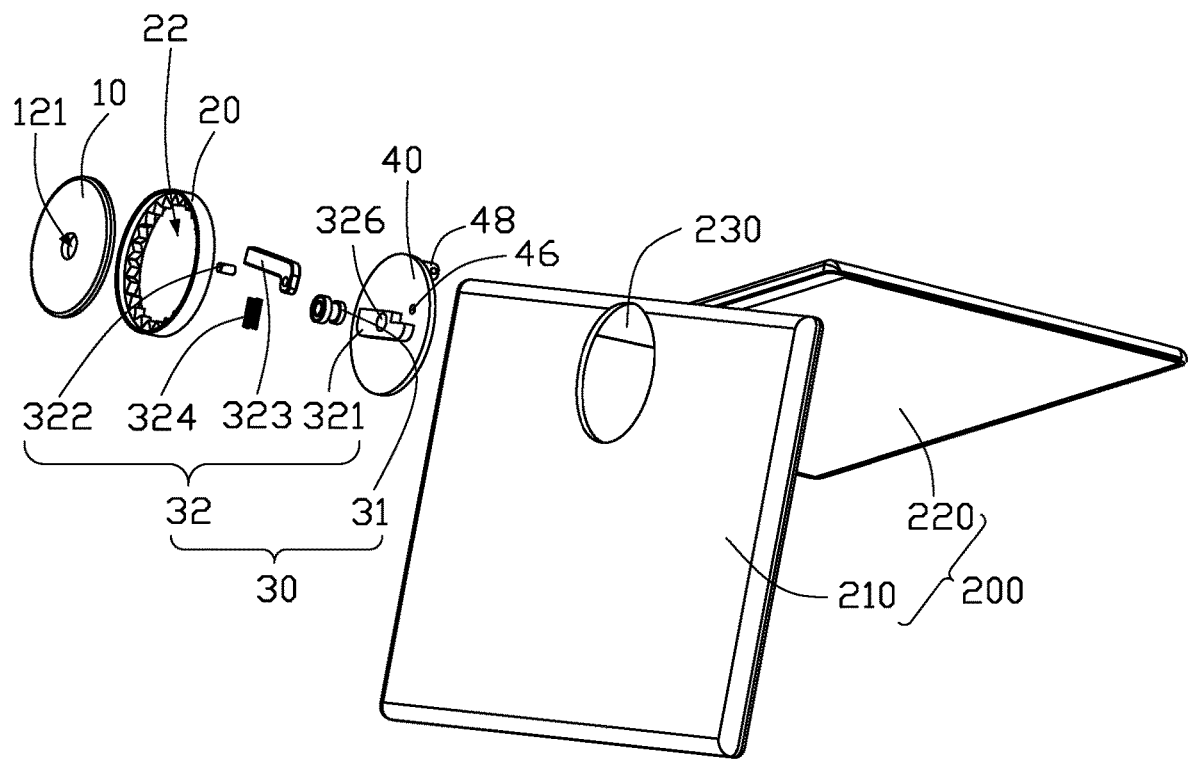
FIG. 8 is an exploded isometric view of the rotating device of FIG. 7.

FIG. 8 illustrates that the rotating device 400 utilizes a mounting hole 230 of the product 200. Similar to the first embodiment, the rotating device 400 includes a base 10, an angle defining disk 20, a rotating mechanism 30 arranged on the base 10, and a positioning mechanism 40 connected to the rotating mechanism 30. The rotating mechanism 30 includes a shaft 31 and a rotating handle 32. The rotating handle 32 includes a main body 321, a pivot 322, a holding part 323, and an elastic member 324.

The third embodiment is different from the first embodiment in that the base 10 and the positioning mechanism 40 are both disk shaped, and the angle defining disk 20 and the rotating mechanism 30 are both disposed between the base 10 and the positioning mechanism 40. The main body 321 is received in the through hole 22 and connected to the positioning mechanism 40, the holding part 323 is pivotally connected to the positioning mechanism 40 through the pivot 322, and one end of the holding part 323 away from the pivot 322 is held in one of the locating slots 21, and the elastic member 324 is arranged between the main body 321 and the holding part 323.

The main body 321 further defines a first rotating hole 326. The positioning mechanism 40 defines a connecting hole 46. The shaft 31 passes through the first rotating hole 326, and the pivot 322 passes through the connecting hole 46 and the holding part 323. One end of the holding part 323 away from the elastic member 324 is rotatably connected to the positioning mechanism 40 through the pivot 322.

The positioning mechanism 40 further includes a positioning protrusion 48 configured to position the display 220. The display 220 rotates to drive the positioning mechanism 40 and the rotating mechanism 30 to rotate synchronously, and the angle of rotation of the rotating mechanism 30 is defined by the angle defining disk 20, so as to accurately control the angle of rotation of the display 220 relative to the notebook computer host 210.

In other embodiments, a depth of the mounting hole 230 is smaller than a thickness of the notebook computer host 210. The base 10 and the positioning mechanism 40 can have other shapes, such as rectangular, polygonal, triangular, or circular.

The rotating device 100 defines the rotation angle of the rotating mechanism 30 through the angle defining disk 20, thereby allowing rotation through multiple precision angles, and positioning of the product. The rotation angle is controlled precisely, the rotating device 100 is simple, and the rotation process is stable, easy to implement, economical, and practical.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A rotating device configured to rotate and position a product at multiple angles, the rotating device comprising:
    a base;
    an angle defining disk connected to the base, a central portion of the angle defining disk defining a circular through hole;
    a rotating mechanism connected to the base and received in the through hole; and
    a positioning mechanism connected to the rotating mechanism and configured for positioning a product;
    wherein an inner wall of the through hole comprises a plurality of locating slots arranged along a circumference of the through hole, and an opening of each of the locating slots faces a center of the through hole; and
    wherein the rotating mechanism is capable of rotating in the through hole by an external force and driving the positioning mechanism to rotate relative to the angle defining disk, and the rotating mechanism is positioned from one locating slot to another locating slot by rotating the rotating mechanism;
    wherein the rotating mechanism comprises a shaft and a rotating handle, one end of the shaft is connected to the positioning mechanism, and another end of the shaft passes through the rotating handle;
    wherein the rotating handle comprises a main body, a pivot, a holding part, and an elastic member, the main body is received in the through hole, the holding part is pivotally connected to the main body through the pivot, and one end of the holding part away from the pivot is held in one of the locating slots, and the elastic member is arranged between the main body and the holding part.

2. The rotating device of claim 1, wherein the locating slot is V-shaped or U-shaped.

3. The rotating device of claim 1, wherein the main body defines a receiving groove, the pivot and the elastic member are received in the receiving groove, one end of the holding part is received in the receiving groove, and another end of the holding part is held in one of the locating slots.

4. The rotating device of claim 1, wherein the main body further defines a first rotating hole and a second rotating hole, the shaft passes through the first rotating hole, and the pivot passes through the second rotating hole and the holding part.

5. The rotating device of claim 1, wherein a bearing is sleeved on the shaft, the bearing is configured to reduce vibrations of the shaft when the shaft rotates.

6. The rotating device of claim 1, wherein the holding part comprises a first limiting surface and a second limiting surface vertically connected to the first limiting surface, and the first limiting surface and the second limiting surface abut against two opposing surfaces of the locating slot, respectively.

7. The rotating device of claim 6, wherein the connection between the first limiting surface and the second limiting surface is a chamfer.

8. The rotating device of claim 1, wherein the base comprises a first fixing plate, a second fixing plate and a connecting plate vertically connected to the first fixing plate, the angle defining disk is fixed to the second fixing plate, the second fixing plate defines a shaft hole, the shaft passes through the shaft hole, the angle defining disk and the positioning mechanism are arranged at two sides of the second fixing plate, respectively.

9. The rotating device of claim 1, wherein the positioning mechanism comprises a support plate and a plurality of guiding blocks arranged on the support plate.

* * * * *